(12) United States Patent  
Suzuki

(10) Patent No.: US 8,953,213 B2  
(45) Date of Patent: Feb. 10, 2015

(54) IMAGE READING APPARATUS, CONTROL METHOD THEREOF, AND RECORDING MEDIUM

(75) Inventor: Kiwamu Suzuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 64 days.

(21) Appl. No.: 13/597,080

(22) Filed: Aug. 28, 2012

(65) Prior Publication Data

US 2013/0057928 A1    Mar. 7, 2013

(30) Foreign Application Priority Data

Sep. 1, 2011    (JP) .................................. 2011-190879

(51) Int. Cl.
```
H04N 1/04      (2006.01)
H04N 1/58      (2006.01)
H04N 1/00      (2006.01)
H04N 1/32      (2006.01)
```

(52) U.S. Cl.  
CPC ....... *H04N 1/00204* (2013.01); *H04N 1/00278* (2013.01); *H04N 1/00578* (2013.01); *H04N 1/0058* (2013.01); *H04N 1/00612* (2013.01); *H04N 1/32363* (2013.01); *H04N 1/32464* (2013.01); *H04N 2201/3288* (2013.01); *H04N 2201/0039* (2013.01)  
USPC .......................... 358/1.16; 358/474; 358/1.13

(58) Field of Classification Search  
CPC .......... H04N 1/00204; H04N 1/00278; H04N 1/00578; H04N 1/0058; H04N 1/00612; H04N 1/32363; H04N 1/32464; H04N 2201/0039; H04N 2201/3288

USPC ........................................................ 358/474  
See application file for complete search history.

(56) References Cited

U.S. PATENT DOCUMENTS

```
5,491,557    A  *  2/1996   Nakajima et al. .............. 358/296
2009/0323097 A1 * 12/2009  Iizuka .......................... 358/1.14
2010/0271645 A1 * 10/2010  Nakabayashi ................. 358/1.9
2011/0179294 A1 *  7/2011  Hagiuda ........................ 713/320
```

FOREIGN PATENT DOCUMENTS

```
JP       2006-327728       * 12/2006
JP       2006-327728  A     12/2006
JP        2006327728  A  * 12/2006
```

* cited by examiner

*Primary Examiner* — King Poon  
*Assistant Examiner* — Ibrahim Siddo  
(74) *Attorney, Agent, or Firm* — Canon U.S.A., Inc., IP Division

(57) ABSTRACT

An image reading apparatus includes a reading unit that, after reading an image of a first side of a first document and an image of a first side of a second document, reads an image of a second side of the first document and an image of a second side of the second document, and an output unit configured to output the image of the first side of the first document read by the reading unit, store the image of the second side of the first document read by the reading unit in a storage unit, and after outputting the image of the first side of the second document read by the reading unit, output the image of the second side of the first document stored in the storage unit, and output the image of the second side of the second document read by the reading unit.

7 Claims, 11 Drawing Sheets

IMAGE READING APPARATUS, CONTROL METHOD THEREOF, AND RECORDING MEDIUM

BACKGROUND OF THE INVENTION

1. Field of the Invention

The present invention relates to an image reading apparatus, a control method thereof, and a recording medium.

2. Description of the Related Art

An image reading apparatus such as a copying machine or a multifunction peripheral prints image data of a document or transmits such data to a designated address by acquiring the image data from a document using a reading device and processing the acquired image data. Some image reading apparatuses are equipped with an automatic document feeder. If a plurality of documents is set on the automatic document feeder, the documents are automatically conveyed to a reading portion of the image reading apparatus one sheet at a time. If an image reading apparatus is not equipped with an automatic document feeder, the user needs to set one document each time on the reading portion, which is extremely inconvenient. Thus, the automatic document feeder is a very useful device.

Some automatic document feeders are equipped with an automatic two-sided document conveying function that allows automatic reading of two sides of a document by one reading device. When the automatic two-sided document conveying method is used, first, the front side of the document is read. Next, the document is reversed and the back side of the document is read. If the document is discharged from the apparatus in this state, a side opposite to the front side of the document is discharged face up compared to the document before the conveyance. Thus, after the back side is read, the document is reversed so that the same side is discharged face up between before and after the reading. Then the document is discharged.

As described above, the automatic two-sided document feeder is useful as it can automatically read both sides of a document and free the user from setting the document in the reading portion of the image reading apparatus each time. However, the reading device is not used efficiently since the reading device remains idle for a long period while the document is being reversed after the reading of the front side is finished and while the document is conveyed after the reading of the back side of the document is finished.

Japanese Patent Application Laid-Open No. 2006-327728 discusses a technique, as described below, for reducing the idle time.

First, the front side of the first document is read. Next, while the first document is temporarily conveyed away from the conveyance path for stand-off to be reversed, the front side of the second document is read. Next, the second document is conveyed away from the conveyance path so that it can be reversed. This stand-off place is different from where the first document has been conveyed. While the second document is conveyed away from the conveyance path, the back side of the first document is read.

Then, in order to reverse the first document again, the first document is further conveyed for stand-off to a place different from where the second document has been conveyed (a third place). In the meantime, the back side of the second document is read. Further, in order to reverse the second document again, the second document is conveyed to the third place. While the second document is conveyed to the third place, the first document is discharged from the apparatus. Finally, the second document is also conveyed from the third place and discharged from the apparatus.

In this manner, in reading two-sided documents, the performance of the reading operation is improved since the reading order of the documents is changed and the second document is read while the first document is reversed.

In the method discussed in Japanese Patent Application Laid-Open No. 2006-327728, the order the images of the documents are read is different from the page order of the documents. After the front side of the first document (first page) is read, the front side of the second document (third page) is read. Then, the back side of the first document (second page) is read and the back side of the second document (fourth page) is read. In order to output the images of the documents, which have been read in such an order, in the correct order, it is necessary to temporarily store the images of the plurality of pages in a storage unit and rearrange them.

Some image reading apparatuses include a function that allows transmission of an image that has been read. There are two types of transmission, memory transmission and direct transmission. In memory transmission, the transmission is started after the storage of the images of the plurality of documents is completed. Indirect transmission, the images are transmitted while they are read. Regarding memory transmission, since the images of a plurality of pages can be stored in the storage unit, the page order can be arranged in the correct order. However, for direct transmission, since the image transmission is started before the storage of the images of a plurality of pages is completed, the images are not transmitted in the correct page order.

The image reading apparatus may only have a small capacity storage unit due to cost reasons. Even if the image reading apparatus has a large capacity storage unit, the available free space of the storage unit maybe small depending on the use status. In the case where the storage capacity is small, the storage unit does not have enough capacity for storing the image data of the plurality of pages which have been read. Thus, the storage unit is unable to temporarily store the image data of the plurality of pages. Accordingly, the pages cannot be rearranged and output in the correct order.

SUMMARY OF THE INVENTION

According to an aspect of the present invention, an image reading apparatus includes a reading unit configured to, after reading an image of a first side of a first document and an image of a first side of a second document, read an image of a second side of the first document and an image of a second side of the second document, and an output unit configured to output the image of the first side of the first document read by the reading unit, store the image of the second side of the first document read by the reading unit in a storage unit, and after outputting the image of the first side of the second document read by the reading unit, output the image of the second side of the first document stored in the storage unit, and output the image of the second side of the second document read by the reading unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<System Configuration>

Figure 1:
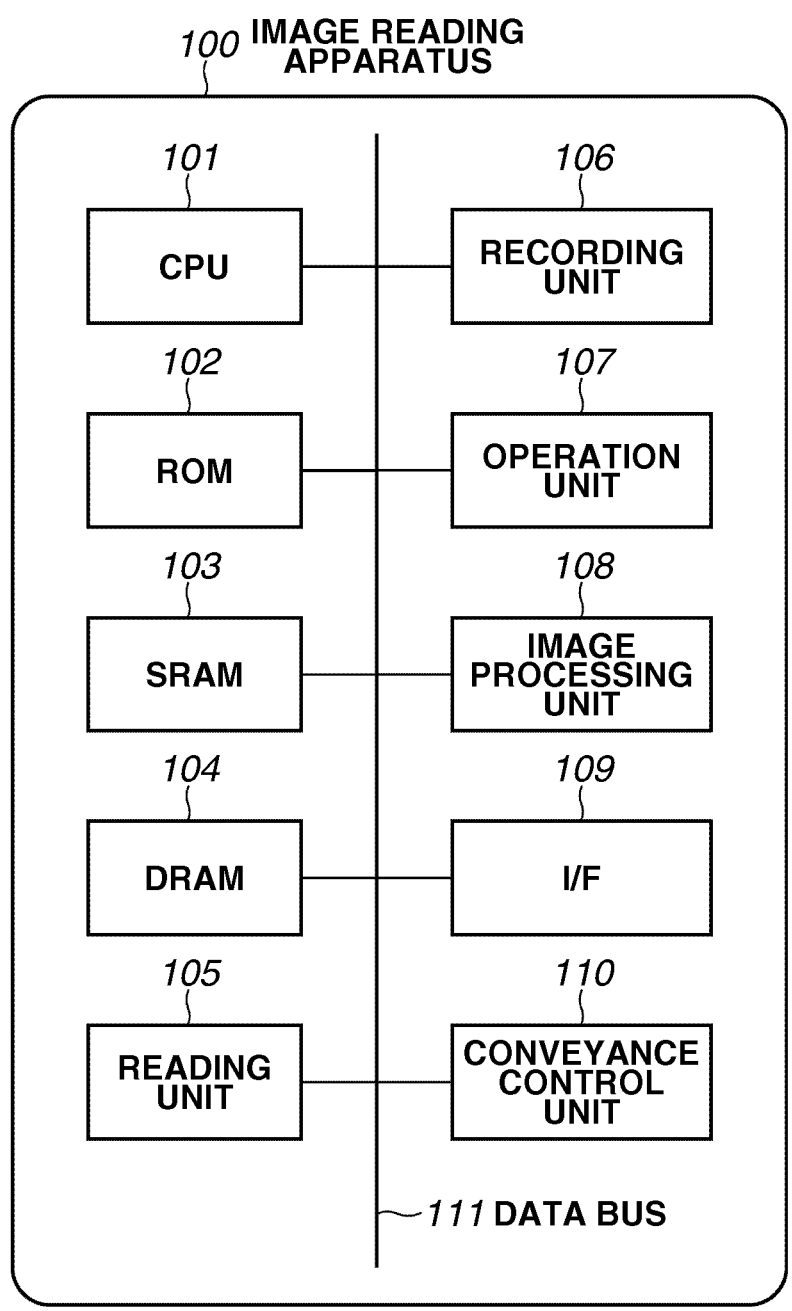
FIG. 1 is a block diagram illustrating a configuration of an image reading apparatus.

FIG. 1 is a block diagram illustrating a configuration of an image reading apparatus 100 according to the present exemplary embodiment. The present exemplary embodiment is described using an image reading apparatus that includes a reading unit and a recording unit and is capable of copying image data that has been read on a recording medium. As described below, an automatic document feeder can be connected to the reading unit. If a two-sided document is set on a document positioning plate, images on both the front and back sides of the document can be read by the reading unit. Thus, the image reading apparatus of the present exemplary embodiment is configured such that the front and back side of a document can be continuously read (the document is reversed before the back side is read) by the reading unit for a plurality of documents.

In FIG. 1, a central processing unit (CPU) 101 controls devices connected to a data bus 111. A read-only memory (ROM) 102 stores a control program of the CPU 101. A static random access memory (SRAM) 103 stores setting values registered by an operator, management data of the devices, and various work buffers. A dynamic random access memory (DRAM) 104 is used as a work memory of the CPU 101 or a page buffer that stores image data, and is used for storing program control variables.

As described below, a reading unit 105 reads an image of a document that has been conveyed and converts the acquired image into binary data. The reading unit 105 includes an automatic document feeder which automatically transmits a document to a reading portion. The automatic document feeder is configured such that the reading side of the document is reversed on the conveyance path, and the front side and the back side of the document are readable in a first reading mode or a second reading mode.

A recording unit 106 outputs the image data read by the reading unit 105 onto a recording medium. An operation unit 107 is an interface unit that displays information of the image reading apparatus for a user. The operation unit 107 also serves as an input unit. An image processing unit 108 performs coding/decoding of the image data used for the copy operation. A variable magnification processing unit that processes the image used in the copying operation is included in the image processing unit 108.

An I/F 109 is used as a communication interface used for communication with an external personal computer (PC), multifunction peripheral, or a facsimile (FAX) machine. According to the present exemplary embodiment, the image reading apparatus 100 transmits image data that has been acquired to an external PC, a multifunction peripheral, or a facsimile machine via the I/F 109 when the second reading mode is set.

A conveyance control unit 110 includes a conveyance roller and a motor that drives the conveyance roller.

Each of the above-described components is connected to the CPU 101 via the data bus 111. Image data is transferred to the I/F 109 and the recording unit 106 via the data bus 111. The image reading apparatus 100 can communicate with different image reading apparatuses or multifunction peripherals equipped with an Internet-capable fax machine and can perform transmission/reception processing of image data via the I/F 109. Further, the I/F 109 can be connected to an external printing apparatus. Data transmission/reception processing between the I/F 109 and the printing apparatus is performed by a predetermined protocol.

In the following description, a case where an image of a document set on a document positioning plate 200 is read by a reading device after the document is conveyed to the reading device by the automatic document feeder and printed on a recording medium by the recording unit 106 will be described. Image data obtained by the reading of the reading unit is stored in the SRAM 103 before it is printed.

A user sets operational parameters for electronic-mail (E-mail) transmission, FAX transmission, data transmission, etc., for written media by operating the operation unit 107 of the image reading apparatus 100 configured as described above. The parameters include a setting for two-sided reading. If this setting is set, the automatic document feeder of the reading unit 105 automatically reverses the document so that both the front and back sides of the document are read by the reading device.

Figure 2:
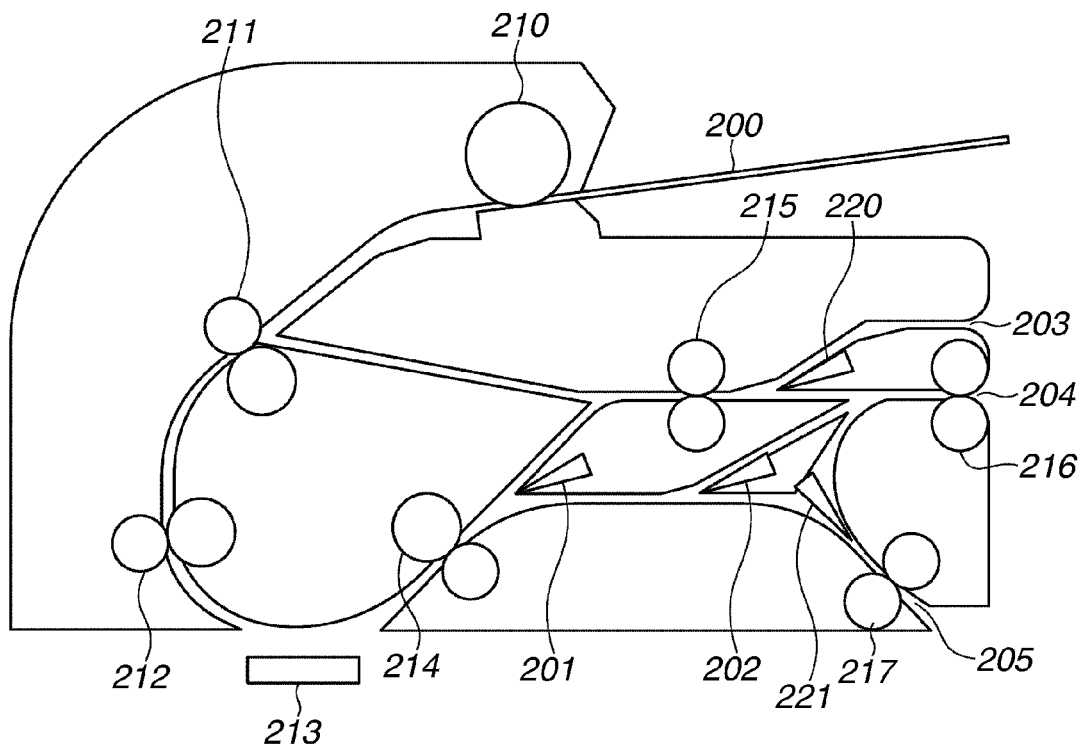
FIG. 2 is a cross section of an automatic document feeder provided in the image reading apparatus.

FIG. 2 is a cross section of the automatic document feeder of the image reading apparatus 100 illustrated in FIG. 1. According to the present exemplary embodiment, the automatic document feeder includes a plurality of recording medium conveyance paths. The conveyance path along which the recording medium is conveyed is changed by a flapper.

In FIG. 2, when the user selects a reading start button on the operation unit 107 after setting a document on the document positioning plate 200, the CPU 101 instructs the conveyance control unit 110 to rotate a roller 210 and roller pairs 211 and 212 so that the document is conveyed. When the document passes by a reading device 213, the CPU 101 instructs the reading device 213 to read the document.

The document is further conveyed by a roller pair 214 to a flapper 201. The CPU 101 controls the flapper 201 to be downward so that the document is conveyed along the upper path. The document is further conveyed by a roller pair 215 to a flapper 220. The CPU 101 controls the flapper 220 to be downward so that the document is conveyed toward an upper reverse outlet slot 203. While a portion near the trailing edge of the document in the conveying direction is nipped by the roller pair 215, the document is temporarily conveyed to the upper reverse outlet slot 203.

The CPU 101 then instructs the conveyance control unit 110 such that the roller pair 215 rotates in a negative direction (the clockwise direction in FIG. 2). The document is then conveyed by the roller pairs 215, 211, and 212. When the document passes by the reading device 213, the CPU 101 instructs the reading unit 105 to read the back side of the document. Subsequently, the CPU 101 controls the flappers 201 and 202 to be upward so that the document, whose back side has been read, is conveyed to a re-reverse outlet slot 205.

Then, while the trailing edge in the conveying direction of the document, the back side of which has been read is nipped by a roller pair 217, the document is conveyed to the re-reverse outlet slot 205. The CPU 101 then instructs the conveyance control unit 110 such that the roller pair 217 rotates in a negative direction (the clockwise direction in FIG. 2) and further controls the flapper 221 to be downward so that the document is conveyed toward a lower reverse outlet slot 204. Next, the document, the back side of which has been read, is conveyed by the roller pair 217 and a roller pair 216 and discharged from the image reading apparatus 100 from the lower reverse outlet slot 204. The above-description describes the document conveyance control based on a first conveyance path system.

Next, a second conveyance path system will be described. When a document is set on the document positioning plate 200, the CPU 101 instructs the conveyance control unit 110 to rotate the roller 210 and the roller pairs 211 and 212, and conveys the document. When the document passes by the reading device 213, the CPU 101 instructs the reading device 213 to read the document. Then, the document is conveyed by the roller pair 214.

Further, the CPU 101 controls the flapper 201 to be upward and the flapper 202 to be downward so that the document is conveyed to the lower reverse outlet slot 204. When the document is conveyed to the roller pair 216, the CPU 101 controls the roller pair 216 so that the trailing edge of the document in the conveying direction is nipped by the roller pair 216 and the document is temporarily conveyed to the lower reverse outlet slot 204.

Then, the CPU 101 instructs the conveyance control unit 110 so that the roller pair 216 rotates in a negative direction (the clockwise direction in FIG. 2). The document is then conveyed to the direction of the roller pair 215. Since the CPU 101 instructs the conveyance control unit 110 to control the roller pairs 215, 211, and 212, the document is conveyed to the reading device 213. When the document passes by the reading device 213, the image on the back side is read by the reading device. Subsequently, the CPU 101 controls the flapper 201 and the flapper 202 to be upward.

The document is conveyed to the roller pair 217 and further conveyed to the re-reverse outlet slot 205 on the lower side via the roller pair 217. Then, while the trailing edge of the document in the conveying direction is nipped by the roller pair 217, the CPU 201 controls the flapper 221 to be downward so that the document is reverse-conveyed to the lower reverse outlet slot 204 by the roller pair 216 and discharged from the image reading apparatus 100.

Next, the operation of the image reading apparatus 100 in a "regular order reading mode" using the automatic document feeder illustrated in FIG. 2 will be described with reference to FIG. 3. When the image reading apparatus 100 is in the "regular order reading mode", the front and the back sides of a document are read in the regular order.

Figure 3:
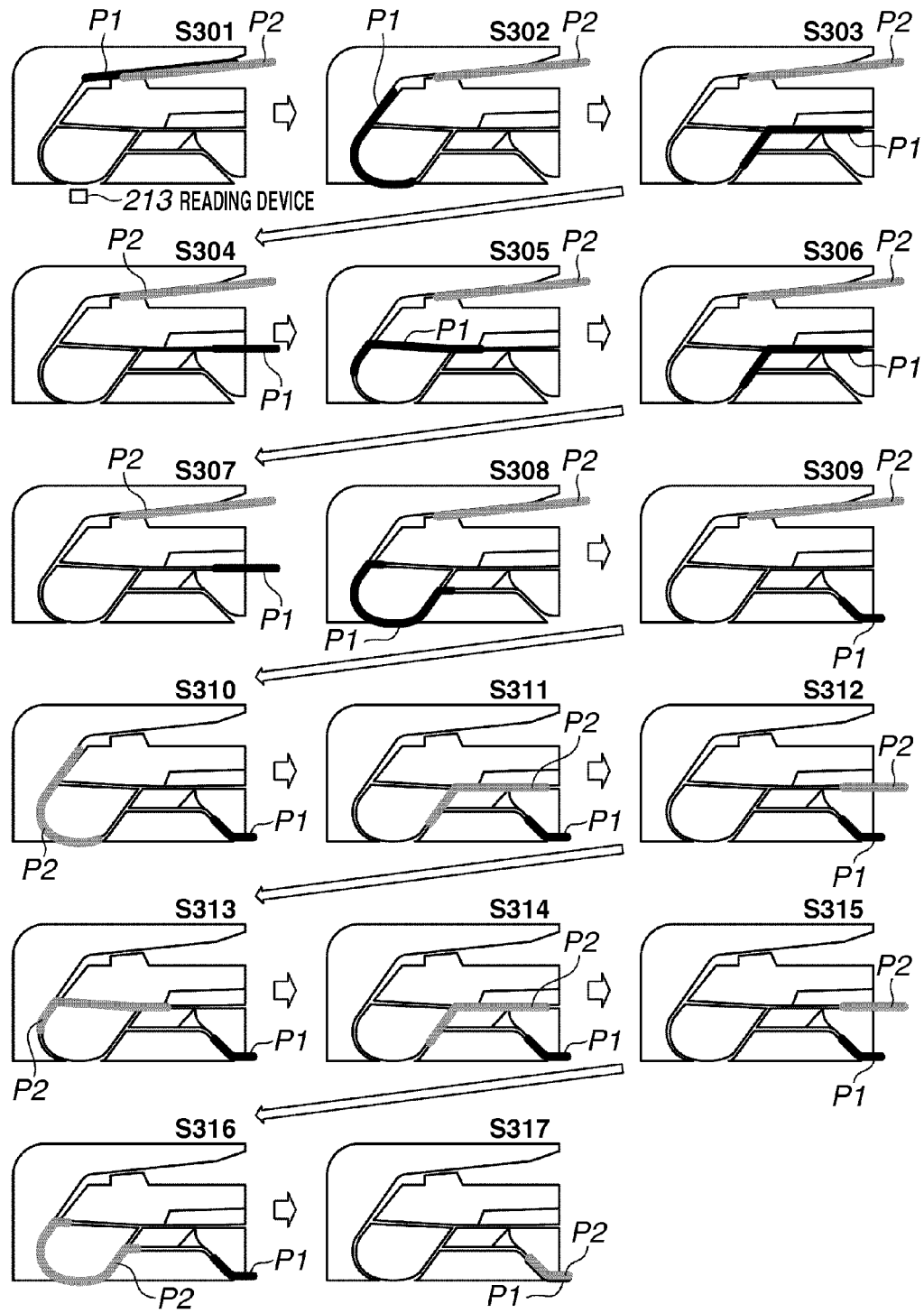
FIG. 3 illustrates conveying states of the documents fed by the automatic document feeder.
Figure 4:
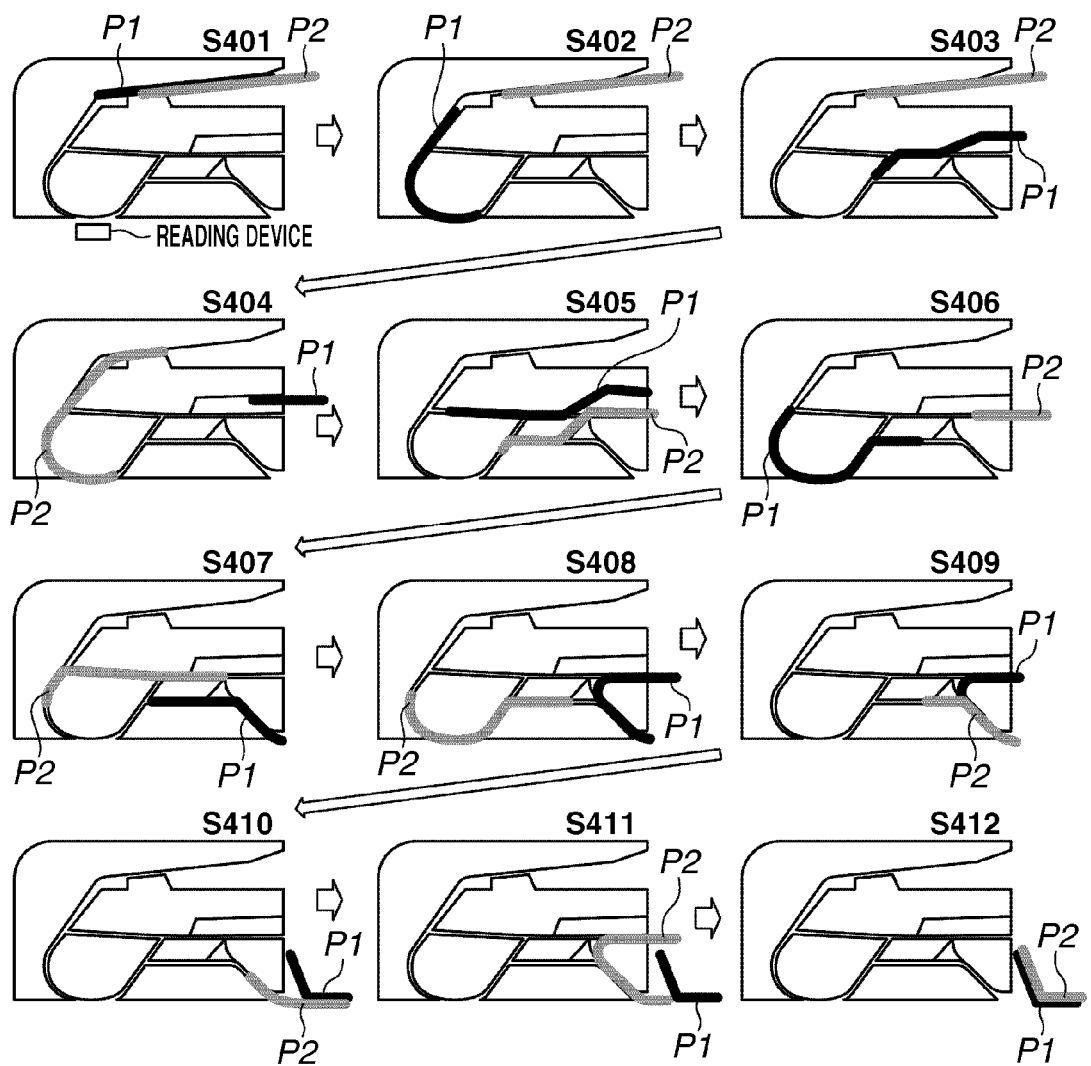
FIG. 4 illustrates conveying states of the documents fed by the automatic document feeder.

FIGS. 3 and 4 illustrate the automatic document feeder illustrated in FIG. 2 in various document conveyance states. The black line indicates a document P1 which is read first. The gray line indicates a document P2 which is read after the document P1. Each of steps S301 to S317 designates a document conveyance step.

In FIG. 3, the documents P1 and P2 are set on the automatic document feeder with the document P1 placed on top of the document P2. Both the documents P1 and P2 have the front sides face up. When the reading start button of the operation unit 107 is selected by the user, two-sided reading is started. In step S301, as described above, the roller 210 and the roller pairs 211 and 212 are rotated and the document P1 (the first document) is conveyed along the conveyance path.

In step S302, the document P1 passes by the reading device 213 with the front side face down and the front side of the document P1 is read. When the reading of the front side of the document P1 is finished, the document P1 is reversed so that the back side of the document P1 can be read.

In steps S303 and 304, the document P1 is conveyed forward and is prepared for the reversing. In step S305, the document P1 is conveyed to the reading device 213. This time, the back side of the document P1 is face up. The document P1 is conveyed such that the trailing edge of the document P1 becomes now the head of the document in the conveying direction. In step S306, the document P1 is conveyed along the conveying path to the reading device 213 with the back side face down. Accordingly, the back side of the document P1 is read.

Although the reading of the front and the back sides of the document P1 is finished, if the document P1 is discharged from the apparatus in this state with the front side face up, when the next document (document P2) is discharged on the document P1 with the front side face up, the order of the documents will be different from the order when the documents were set on the document positioning plate. Thus, the document P1 is reversed again before it is discharged. In steps S307, the document P1 is prepared for the reversing and in S308, the document P1 is reversed again while it is conveyed along the same conveying path. In step S309, the document P1 is conveyed along the discharge conveying path and is discharged from the image reading apparatus 100.

In step S310, when the reading of the front and the back sides of the document P1 is finished, the reading of the document P2 is started. Since the two-sided reading operation of the document P2 (steps S310 to 317) is similar to the operation performed for the document P1, the description of the operation is not repeated.

In this manner, the two-sided reading in the "regular order reading mode" is performed in the order of "front side reading", "document reverse", "back side reading", "document reverse again", and "discharge" for each document.

In the "regular order reading mode", the time the reading device 213 takes while not reading the document is long. To be more precise, since the images are read in the page order of the document in the regular order reading mode, the time after the front side of the document is read by the reading device 213 until the document is reversed and the reading of the back side of the document is started (steps S303 to S305) is long.

Further, in the regular order reading mode, after the reading of the back side of the first document is finished, since the document needs to be reversed again (steps S306 to 308) using the conveying path which is to be used by the second document, the second document cannot be read while the first document is being reversed again. This also reduces the reading efficiency.

In order to read the document more efficiently than the "regular order reading mode", a mode called "collective reading mode" is also used. According to the "collective reading mode", the front sides of a plurality of documents are continuously read. Then, the back sides of the documents are continuously read. According to the present embodiment, the "regular order reading mode" is called the first reading mode and the "collective reading mode" is called the second reading mode.

The operation of two-sided reading in the "collective reading mode" will now be described with reference to FIG. 4.

The user places two documents, the document P1 on the document P2, on the automatic document feeder, with the front sides face up, and starts the two-sided reading. When start of the two-sided reading is instructed, in step S401, the document P1 is conveyed. In step S402, the document P1 is conveyed to the reading device 213 with the front side face down, and the front side of the document P1 is read. Thus, the reading of the front side of the document P1 ends.

In step S403, before reversing the document P1 and reading the back side image of the document P1, the document P1 is once conveyed forward and prepared for the reversing. The CPU 101 instructs the conveyance control unit 110 to control the flapper so that the document P1 is conveyed along the upper conveying path. Further, while the document P1 is conveyed along the upper conveying path, the conveyance of the document P2 is started so that its front side is read by the reading device 213.

In step S404, while the document P1 is conveyed along the upper conveying path, the front side of the document P2 is read by the reading device 213. In step S405, the document P1 is reversed and conveyed again to the reading device 213 so that the back side of the document P1 is read. In the meantime, the document P2 is conveyed along the lower conveying path according to the flapper controlled by the CPU 101. The document P2 is conveyed along the lower conveying path so that it can be reversed and has its back side read. The document P1 in this state has the back side face up and is conveyed with its trailing edge as the head of the sheet in the conveying direction.

In step S406, the document P1 is conveyed along the conveying path again to the reading device 213 with the back side face down. While the back side of the document P1 is being read by the reading device, the document P2 is reversed. In step S407, since the reading of the front and the back sides of the document P1 is finished, the document P1 is conveyed along the lowest conveying path so that it is reversed again. While the document P1 is conveyed along the lowest conveying path, the document P2 is conveyed with the back side face up and having its trailing edge as the head of the sheet in the conveying direction.

In step S408, the document P2 is conveyed to the reading device 213 and its back side is read by the reading device 213. The document P1 is reversed while it is conveyed along the re-reverse conveying path. In step S409, the document P1 is discharged from the apparatus. Simultaneously, the document P2 is conveyed along the lowest conveying path so that it is reversed. In steps S410 to 412, the document P2 is reversed and then discharged from the apparatus.

As described above, in the "collective reading mode", while the document P1 is reversed, the document P2 (the next document) is conveyed and its image is read. Accordingly, the reading efficiency is improved.

In the "regular order reading mode", the images are read in the order of the front side of the first sheet, back side of the first sheet, front side of the second sheet, back side of the second sheet, front side of the third sheet, back side of the third sheet, and so forth.

However, in the "collective reading mode", the images are read in the order of the front side of the first sheet, front side of the second sheet, back side of the first sheet, back side of the second sheet, front side of the third sheet, front side of the fourth sheet, and so forth. If the sheets are numbered, the above-described sheet order will be the first page, third page, second page, fourth page, fifth page, seventh page, sixth page, eighth page, ninth page, eleventh page, tenth page, and twelfth page.

In order to output the images of the documents which have been read in this order in the correct order, the images of the plurality of pages need to be temporarily stored in a storage unit such as the DRAM 104 (or a HDD).

However, the images of the plurality of pages cannot always be stored in the storage unit depending on the type of image transmission. Regarding the image reading apparatus, there are two types of image transmission: memory transmission and direct transmission. If the memory transmission is used, the transmission is started after the images of the plurality of pages are stored. On the other hand, if the direct transmission is used, the images can be transmitted while they are read. In the case of memory transmission, since the images of the plurality of pages are stored in the storage unit such as the DRAM 104, the pages can be arranged in the correct order. On the other hand, in the case of direct transmission, since the image transmission is started before the image storage of the plurality of pages is completed, the images are not transmitted in the correct order.

Thus, according to the present embodiment, if the images of the documents which have been read are to be transmitted using the direct transmission method, the images of the documents will be read in the "regular order reading mode". If a transmission method other than the direct transmission method is designated, the images of the documents will be read in the "collective reading mode" as described below.

Figure 5:
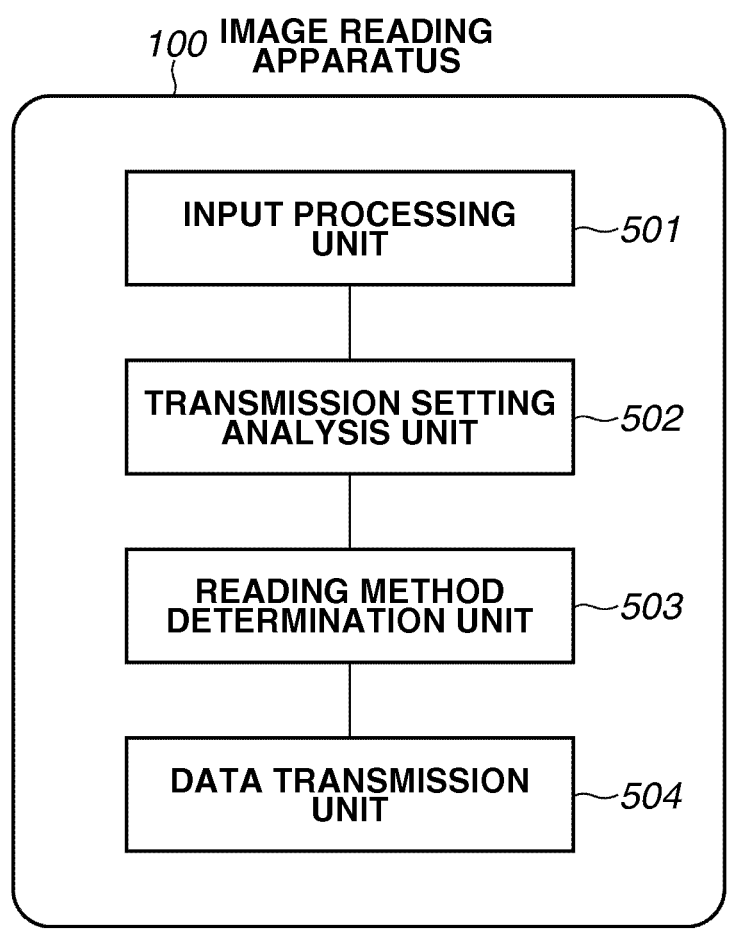
FIG. 5 is a block diagram illustrating data transmission processing of the image reading apparatus.

FIG. 5 is a block diagram illustrating the modules regarding the data transmission processing of the image reading apparatus 100 illustrated in FIG. 1. The data transmission processing is an example of typical data transmission processing of data to an external apparatus by FAX transmission, E-mail transmission, or transmission for storage in media. Each module regarding the reading data transmission processing is stored in the ROM 102 of the image reading apparatus 100, loaded into the SRAM 103 or the DRAM 104, and executed by the CPU 101.

In FIG. 5, an input processing unit 501 is a module that performs document reading setting and transmission setting. A transmission setting analysis unit 502 is a module that analyzes the transmission setting. A reading method determination unit 503 is a module that determines which of the reading methods, the "regular order reading mode" or the "collective reading mode", is to be used in the operation of the reading apparatus. A data transmission unit 504 is a module that transmits data to an external device.

Figure 6:
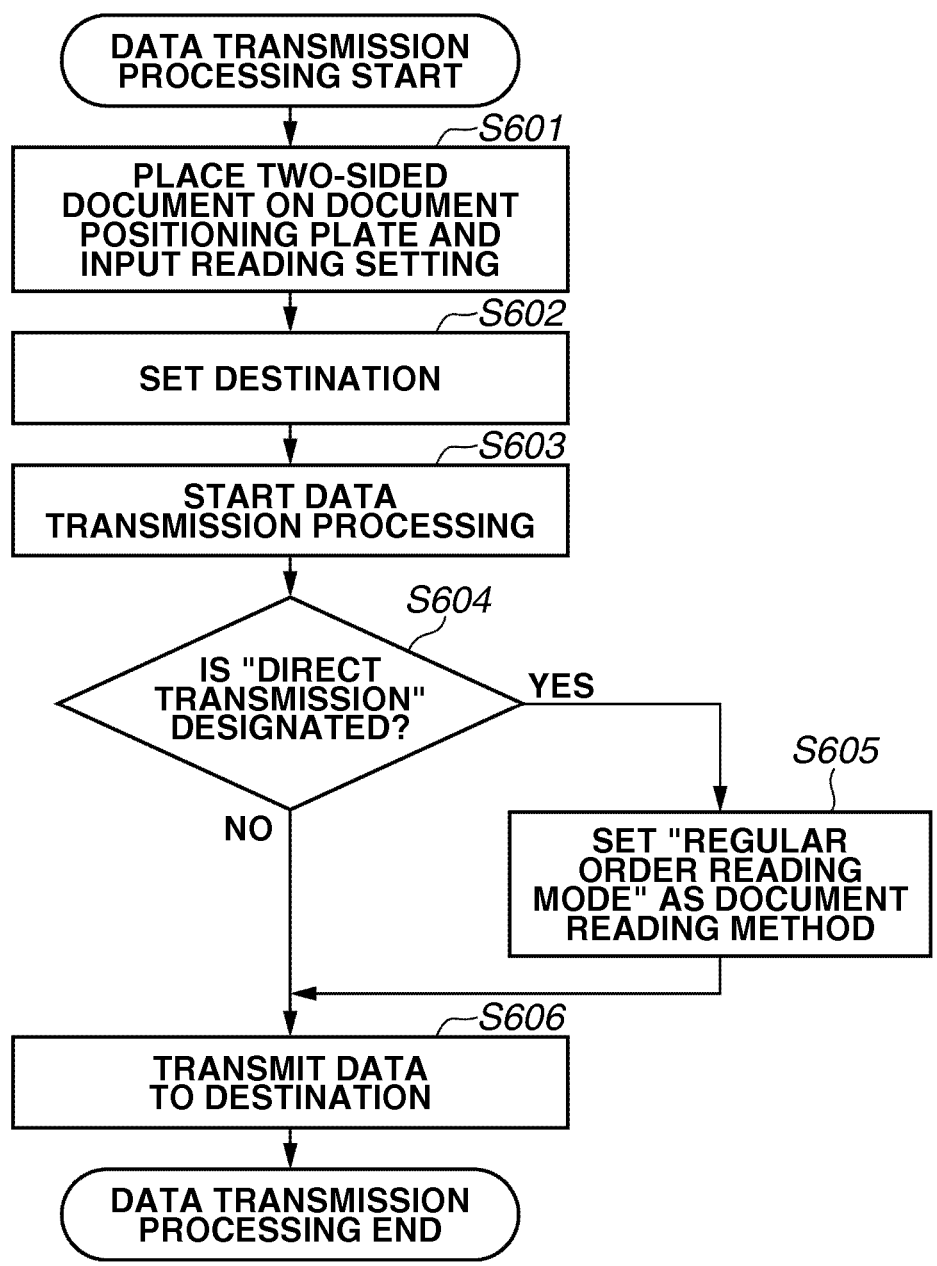
FIG. 6 is a flowchart illustrating a control method of the image reading apparatus.

FIG. 6 is a flowchart illustrating a control method of the image reading apparatus 100 which performs the data transmission processing according to the present embodiment. Each step in the flowchart is realized by the CPU 101 executing each of the programs, illustrated in FIG. 5, loaded from the ROM 102 into the DRAM 104.

In step S601, the user places two-sided documents on the document positioning plate of the image reading apparatus 100. Additionally, the user inputs the document reading setting (document size, color, reading resolution) and the destination of the image data by using the operation unit 107. Based on the values input by the user, the CPU 101 performs the reading setting of the document.

In step S602, the CPU 101 sets the destination input by the user as the destination of the image data. In step S603, when the document reading start button is selected by the user, the CPU 101 starts the data transmission processing. More specifically, according to the data transmission processing, the CPU 101 instructs the reading unit 105 to read the document according to the reading setting set in step S601, generates image data of the document, and transmits the generated image data to the address set in step S602.

In step S604, when the data transmission processing is started, the CPU 101 determines whether the direct transmission is designated as the document transmission method.

If the CPU 101 determines that the direct transmission is designated (YES in step S604), the processing proceeds to step S605. In step S605, the CPU 101 instructs the reading method determination unit 503 to determine that the reading method is the "regular order reading mode", and the processing proceeds to step S606.

In step S606, the CPU 101 reads the images of the documents in the above-described "regular order reading mode", stores the obtained image data in the DRAM 104, and transmits the image data stored in the DRAM 104 to the destination in the order the images are stored in the DRAM 104. Then, the processing ends. Regarding the image data stored in the DRAM 104, the storage area of the image data which has been transmitted can be used by the new image data.

In step S604, if the CPU 101 determines that a transmission method other than the direct transmission (e.g., memory transmission) is designated (NO in step S604), the processing proceeds to step S606. the CPU 101 determines that the reading method of the document is the "collective reading mode". In step S606, the CPU 101 performs the reading of the images of the documents in the above-described "collective reading mode". After the images are temporarily stored in the DRAM 104, the images are rearranged in the correct order (page order). Then, the CPU 101 transmits the rearranged image data to the destination, and the processing ends.

As described above, if the direct transmission is designated as the transmission method of the images of the documents for the image reading apparatus, the images will be read in the "regular order reading mode". If a different transmission method is designated, the images will be read in the "collective reading mode". In this manner, image data can be transmitted to the destination in the correct page order with enhanced performance of reading operation.

Regarding the flowchart in FIG. 5 according to the above-described first exemplary embodiment, the obtained image data is transmitted to an external apparatus. However, according to a second exemplary embodiment, the acquired image data is transmitted to a Secure Digital (SD) card or a Universal Serial Bus (USB) memory card. In such a case, in the flowchart in FIG. 6, the destination (storage) of the image data will be a SD card or a USB memory card.

According to the first exemplary embodiment, if the direct transmission is set as the method for transmitting the image data which has been acquired, the image data is transmitted in the correct page order to the destination by using the "regular order reading mode". Although the image data can be transmitted in the correct page order according to the first exemplary embodiment, since the "regular order reading mode" is used, the reading performance is not enhanced.

According to a third exemplary embodiment, even if the transmission method is a method that transmits images while the images are read such as the direct transmission, a plurality of pages are read in the "collective reading mode" and then transmitted, so that the performance of the reading operation is not decreased.

According to the present embodiment, the use of the memory of the storage unit can be reduced when a plurality of documents are read in the "collective reading mode". Thus, the present invention does not depend on whether the direct transmission is used as the image transmission method.

For example, an embodiment of the present invention can be applied to a case where an image reading apparatus having only a small capacity storage unit for cost reasons reads images of the documents in the "collective reading mode" and transmits the images. Further, another embodiment of the present invention can be applied to a case where an image reading apparatus having a large capacity storage unit but retaining only a small free space reads images of the documents in the "collective reading mode" and transmits the images.

Figure 7:
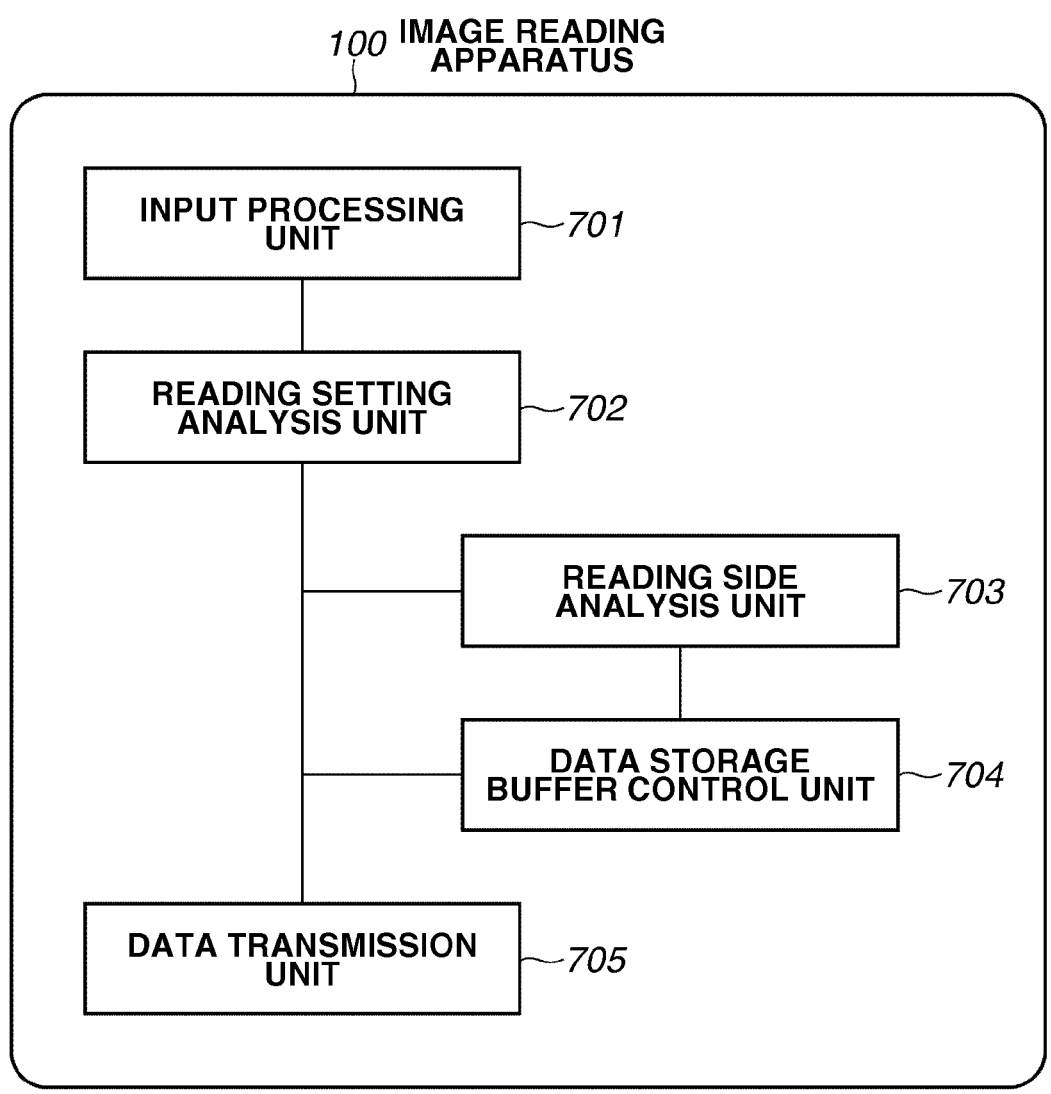
FIG. 7 is a block diagram of the image reading apparatus regarding data transmission processing.

FIG. 7 is a block diagram illustrating the modules of the data transmission processing regarding the image reading apparatus 100 illustrated in FIG. 1. The data transmission processing is typical data transmission processing to an external apparatus by FAX transmission, E-mail transmission, or transmission for storage in media. Each program regarding the reading data transmission processing is stored in the ROM 102 of the image reading apparatus 100, loaded into the SRAM 103 or the DRAM 104, and executed by the CPU 101. In this manner, the data transmission processing is realized.

In FIG. 7, an input processing unit 701 is a module that performs document reading setting and transmission setting. A reading setting analysis unit 702 is a module that analyzes the reading setting. A reading side analysis unit 703 is a module that determines whether the reading side is the front side or the back side or analyzes the number of the reading sides.

A data storage buffer control unit 704 is a module that controls data storage in a temporary buffer in the storage area to store and read the read data. A data transmission unit 705 is a module that transmits data to an external device.

Figure 8:
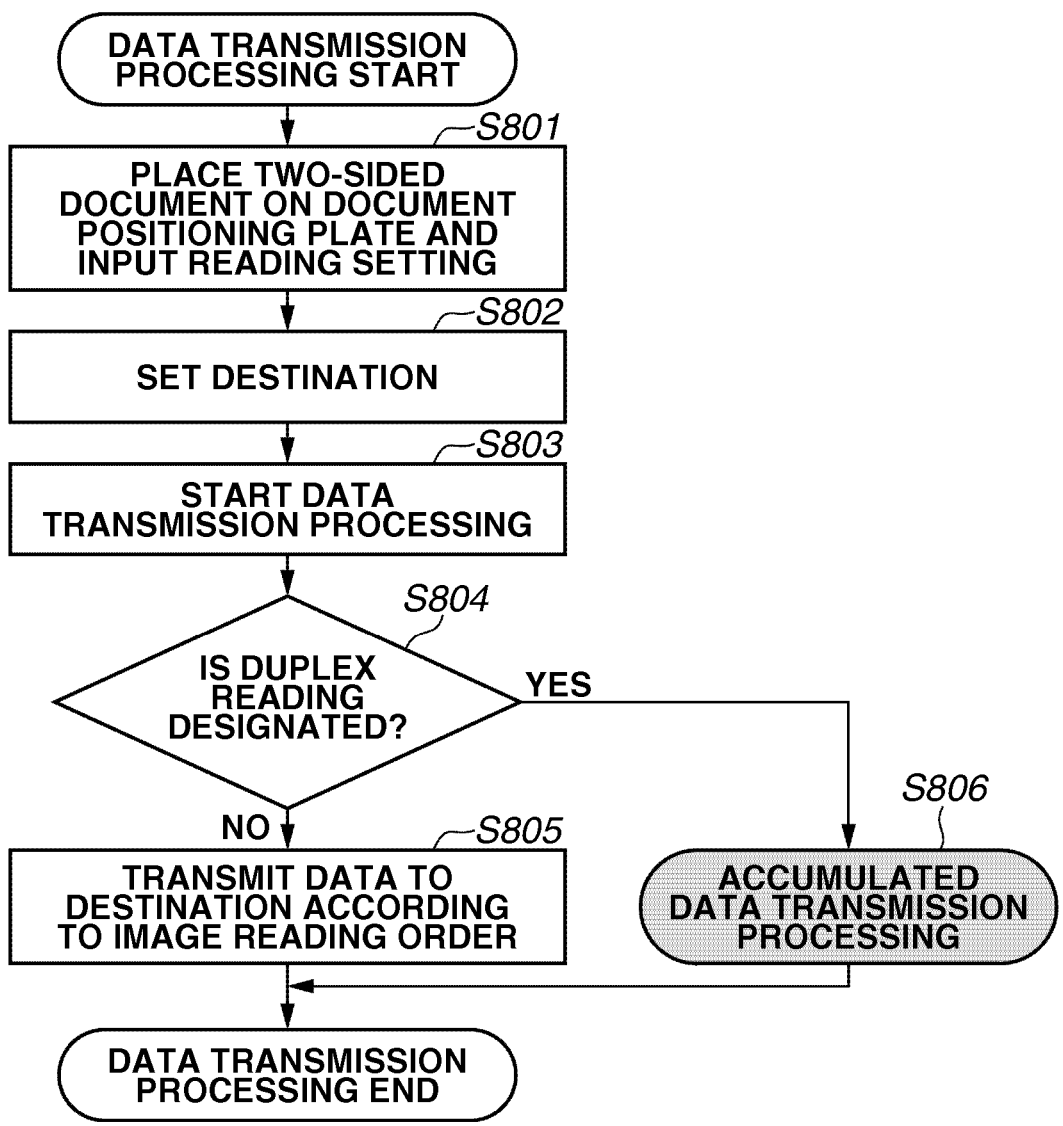
FIG. 8 is a flowchart illustrating a control method of the image reading apparatus.

FIG. 8 is a flowchart illustrating a control method of the image reading apparatus 100 which performs the data transmission processing according to the present embodiment. Each step in the flowchart is realized by the CPU 101 executing each of the programs, illustrated in FIG. 5, loaded from the ROM 102 into the DRAM 104.

In step S801, the user places two-sided documents on the document positioning plate of the image reading apparatus 100. Additionally, the user inputs the document reading setting (document size, color, reading resolution) and the destination of the image data by using the operation unit 107. Based on the values input by the user, the CPU 101 performs the reading setting of the document.

In step S802, the CPU 101 sets the destination input by the user as the destination of the image data. In step S803, when the document reading start button is selected by the user, the CPU 101 starts the data transmission processing. The data transmission processing is the processing performed by the CPU 101. According to the data transmission processing, the CPU 101 instructs the reading unit 105 to read the document according to the reading setting set in step S801, generates image data of the document, and transmits the generated image data to the address set in step S802.

In step S804, when the data transmission processing is started, the CPU 101 determines whether the two-sided reading is set by the user. If the CPU 101 determines that the one-sided reading is set (NO in step S804), the processing proceeds to step S805. In step S805, the CPU 101 transmits the images which have been acquired to the destination in the order they were read, and then the processing ends.

On the other hand, in step S804, if the CPU 101 determines that the two-sided reading is set as the reading method of the documents (YES in step S804), the processing proceeds to step S806. In step S806, the CPU 101 executes accumulated data transmission processing illustrated in FIG. 7, and then the processing ends.

Figure 9:
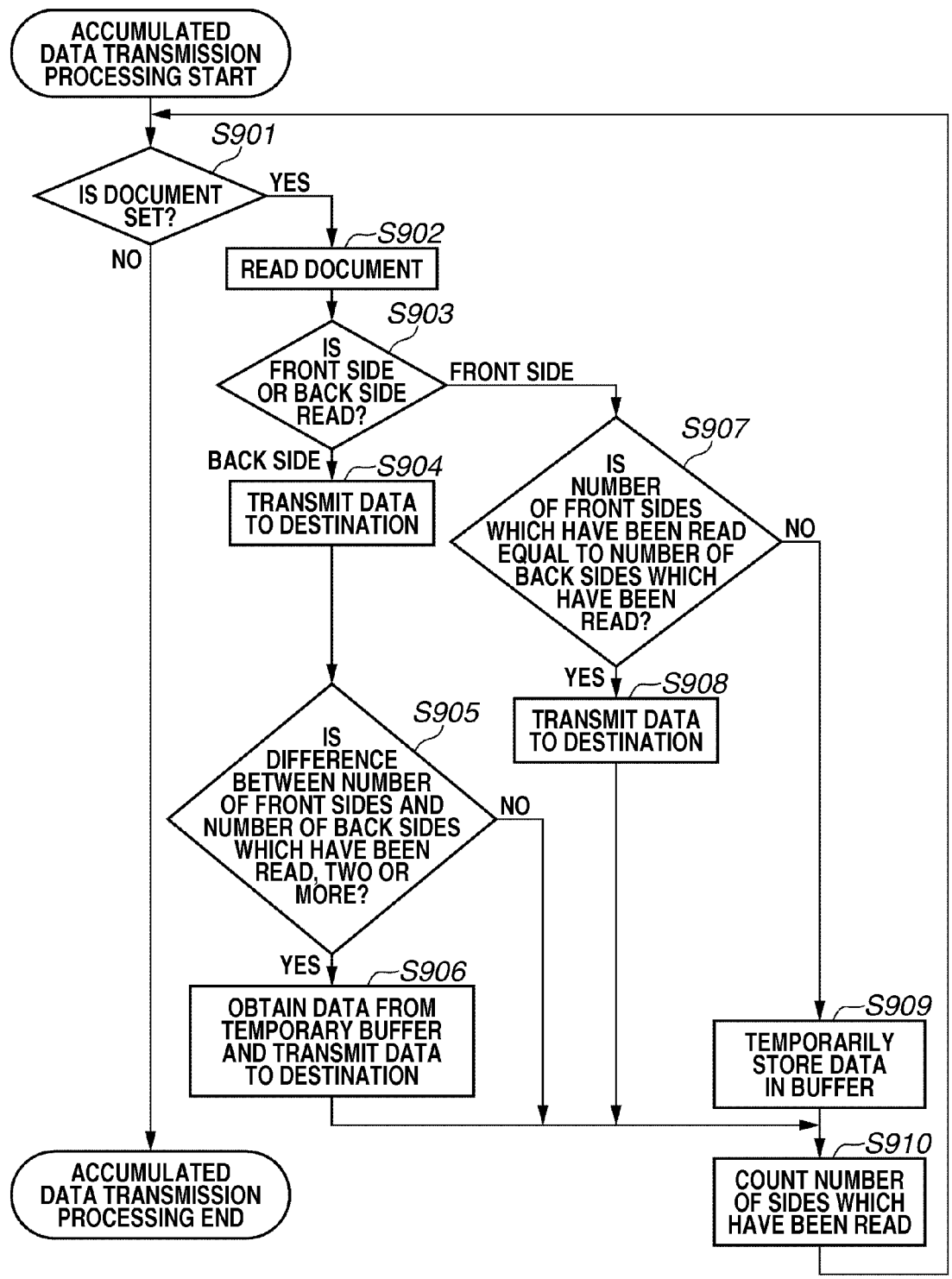
FIG. 9 is a flowchart illustrating a control method of the image reading apparatus.

FIG. 9 is a flowchart illustrating a control method of the image reading apparatus according to the present embodiment. The flowchart illustrates detailed procedures of the accumulated data transmission processing in step S806 in FIG. 8. Each step in the flowchart is realized by the CPU 101 executing each of the programs illustrated in FIG. 5 loaded from the ROM 102 into the DRAM 104.

According to the present embodiment, when the front sides of two documents are continuously read by the reading unit 105 in the second reading mode, the image data acquired from the front side of the first document is output to the I/F 109 and the image data acquired from the front side of the second document is stored in the page buffer. Next, when the reading of the front sides of the two documents by the reading unit 105 in the second reading mode is finished, the documents are reversed, conveyed, and have the back sides of the documents continuously read by the reading unit 105 in the second reading mode.

More specifically, the CPU 101 outputs the image data of the back side of the first document which has been read by the reading unit 105 to the I/F 109. Then, the CPU 101 acquires the image data of the front side of the second document stored in the page buffer and outputs the data to the I/F 109. Subsequently, the CPU 101 outputs the image data of the back side of the second document to the I/F 109 after it is read by the reading unit 105. The back side of the second document is the other side of the second document whose image data on the front side has been acquired from the page buffer. Each step of the control method of the image reading apparatus will be described below.

In step S901, the CPU 101 determines whether documents to be read are set on the document positioning plate. If the CPU 101 determines that documents are not set (NO in step S901), the accumulated data transmission processing ends.

On the other hand, in step S901, if the CPU 101 determines that documents are set (YES in step S901), the processing proceeds to step S902. In step S902, the CPU 101 instructs the reading device 213 to read the document which is conveyed to the reading device.

In step S903, the CPU 101 determines whether the side of the document read by the reading device 213 is the front side.

If the CPU 101 determines that the side of the document read by the reading device 213 is the front side (YES in step S903), the processing proceeds to step S907. In step S907, the CPU 101 determines whether the number of the front sides acquired in step S910 is equal to the number of the back sides acquired in step S910 (whether the number of the front sides whose image data has been acquired before step S902 is equal to the number of the back sides whose image data has been acquired before step S902).

If the CPU 101 determines that the number of the read front sides acquired before step S902 is not equal to the number of the read back sides acquired before step S902 (NO in step S907), the processing proceeds to step S909. In step S909, the CPU 101 executes the data storage buffer control unit 704 so that the image data of the front side of the document which has been read is temporarily stored in the temporary buffer (page buffer) in the storage area.

The page buffer is a memory area in the DRAM 104 used for storing image data of the front sides of a number of pages obtained by subtracting 1 from the number of pages of the front sides which are to be continuously transmitted, for example, in one operation of the accumulated data transmission processing. In step S910, the CPU 101 counts the number of the front sides and the number of the back sides read by the reading device 213. Then, the processing returns to step S901 and the CPU 101 continues the processing until all the documents are processed.

On the other hand, in step S907, if the CPU 101 determines that the number of the read front sides acquired before step S902 is equal to the number of the read back sides acquired before step S902 (YES in step S907), the processing proceeds to step S908. In step S908, the CPU 101 transmits the image data of the document which has been read this time to the destination. Then, the processing proceeds to step S910.

In step S910, the CPU 101 counts the number of the front sides and the number of the back sides read by the reading device 213. Then, the processing returns to step S901. In step S901, the CPU 101 determines whether there is a document to be read, and continues the processing until all the documents are processed.

On the other hand, in step S903, if the CPU 101 determines that the document read by the reading device 213 is the back side (NO in step S903), the processing proceeds to step S904. In step S904, the CPU 101 transmits the image data of the back side of the document which has been read to the destination. In step S905, the CPU 101 determines whether the difference between the number of the front sides acquired in step S910 and the number of the back sides acquired in step S910 (the number of the front sides whose image data has been acquired before step S902 and the number of the back sides whose image data has been acquired before step S902) is two or more.

If the CPU 101 determines that the difference between the number of the read front sides and the number of the read back sides is two or more (YES in step S905), the processing proceeds to step S906. In step S906, the CPU 101 acquires the image data of the front side temporary stored in the buffer in step S909 and transmits the image data of the front side to the destination. Then, the processing proceeds to step S910, and the CPU 101 counts the number of the front sides and the number of the back sides read by the reading device 213.

On the other hand, in step S905, if the CPU 101 determines that the difference between the number of the read front sides and the number of the back sides is less than two (NO in step S905), the processing proceeds to step S910. In step S910, the CPU 101 counts the number of the front sides and the number of the back sides read by the reading device 213. Then, the processing returns to step S901. In step S901, the CPU 101 determines whether there is a document to be read next and continues the processing until all the documents are processed.

In this manner, when the documents are read at a high speed in the second reading mode, even if the reading order of the documents is changed, the acquired image data can be transmitted to the external apparatus in the normal page order. In other words, even if the front sides or the back sides of the documents which are conveyed after they are reversed are consecutively read by the reading device for two pages or more, the image data of the documents can be rearranged so that the images of the front sides and the back sides are arranged in an alternate order before the image data is output to a processing unit such as the I/F 109.

According to the present embodiment, when processing such as E-mail transmission, FAX transmission, or media storage is performed, even if the second reading mode is designated, the order of the images of the documents can be arranged in the correct order. Even if the documents are read at a high speed in the second reading mode, only the page that requires order arrangement is temporarily stored in the buffer. Thus, when the image data is processed, the image data can be processed in the rearranged order. Further, only minimum memory capacity is required for the page buffer used in storing the image data of the front side of the second document (second document or later if there are three or more documents).

Figure 10:
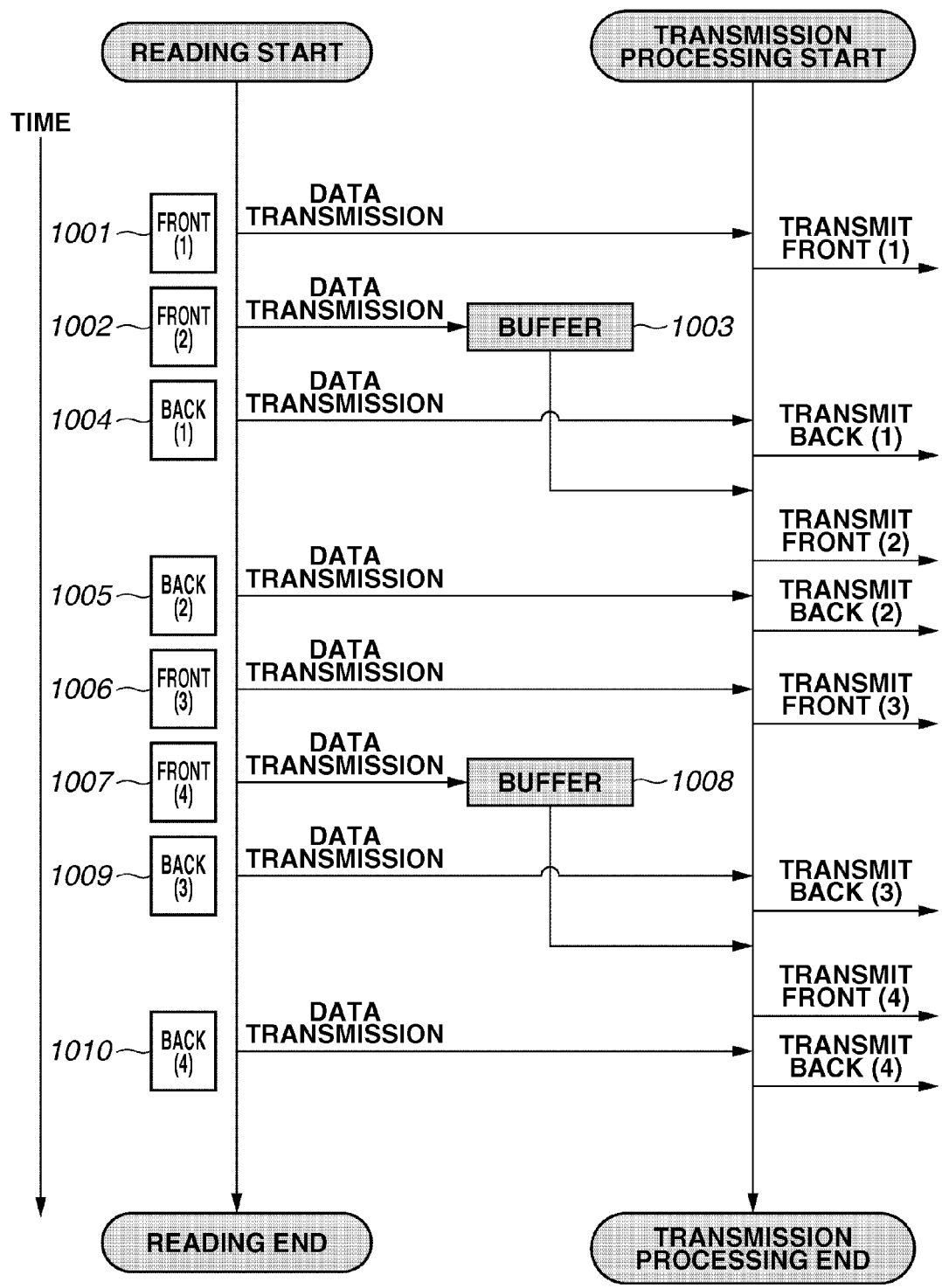
FIG. 10 is a timing chart of image reading and data transmission of the image reading apparatus.

FIG. 10 is a timing chart of the image reading and the data transmission regarding the image reading apparatus 100 according to the present embodiment. The image reading of each document, and the processing for changing transmission order of the acquired image data based on the control in FIGS. 8 and 9 will be described with reference to FIG. 11. The following processing example is a case where two-sided reading of a plurality of sheets is designated and the acquired image data is transmitted by direct transmission to an external apparatus.

In FIG. 10, the processes are given in chronological order from the top to the bottom of the chart. The reading order of the documents read by the automatic two-sided document feeder is: front side (1) 1001→front side (2) 1002→back side (1) 1004→back side (2) 1005→front side (3) 1006→front side (4) 1007→back side (3) 1009→back side (4) 1010.

Figure 11:
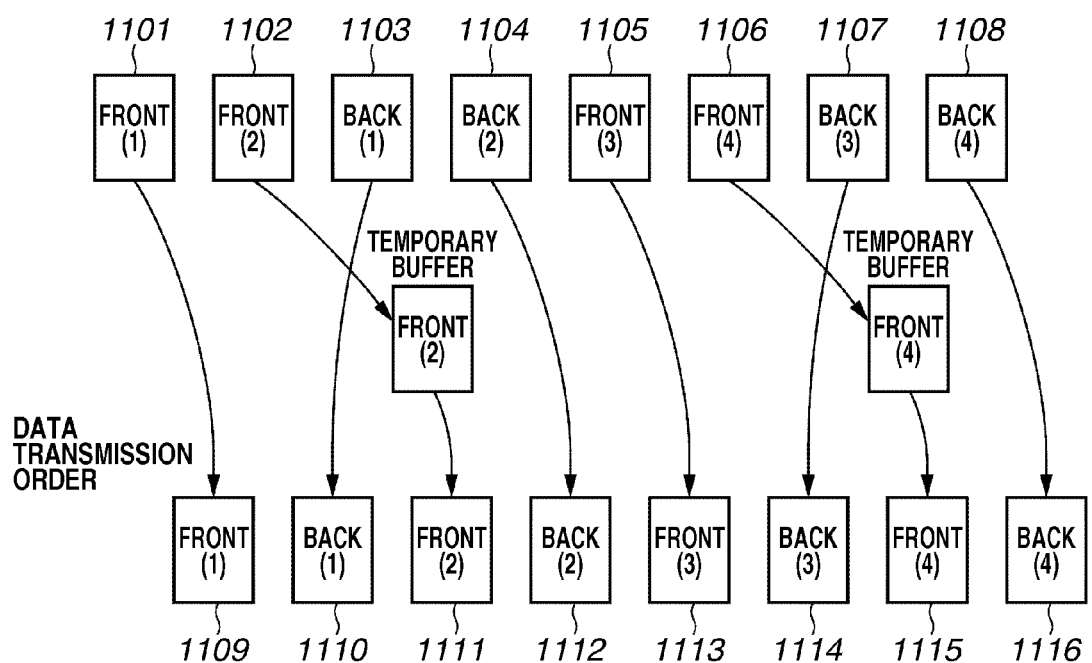
FIG. 11 illustrates an image reading order and a data transmission order of the image reading apparatus.

FIG. 11 illustrates the image reading order and the data transmission order of the image reading apparatus 100 according to the present embodiment.

In FIG. 11, the numerals on the upper side indicate the document reading order and those on the lower side indicate the data transmission order. Further, (1) to (4) indicate the document numbers.

Regarding a front side (1) 1001, which is read first, the CPU 101 determines that it is the front side in step S903 and further determines that the number of the front sides which have been read so far (zero) is equal to the number of the back sides which have been read so far (zero) in step S907. Accordingly, in step S908, the CPU 101 transmits the image data of the front side (1) 1001 to the destination as it is.

Regarding a front side (2) 1002, which is read next, the CPU 101 determines that it is the front side in step S903 and further determines that the number of the front sides which have been read so far (one) is not equal to the number of the back sides which have been read so far (zero) in step S907. Accordingly, in step S909, the CPU 101 temporarily stores the image data of the front side (2) 1002 in the buffer as data (1003).

Regarding a back side (1) 1004, which is read after the front side (2) 1002, the CPU 101 determines that it is the back side in step S903 and further determines that the difference between the number of the front sides which have been read so far (two) and the number of the back sides which have been read so far (zero) is two or more in step S905. In this case, the CPU 101 advances the processing to step S906. In step S906, the CPU 101 acquires the temporarily-stored data (1003) from the buffer and transmits the acquired image data to the destination.

Regarding a back side (2) 1005, which is read after the back side (1) 1004, the CPU 101 determines that it is the back side in step S903 and further determines that the difference between the number of the front sides which have been read so far (in this case, two sides) and the number of the back sides which have been read so far (in this case, one side) is less than two in step S905. Accordingly, the CPU 101 transmits only the image data of the back side (2) 1005 to the destination.

According to the procedures illustrated in FIG. 10, as illustrated in FIG. 11, the documents are read in the order of: front side (1) 1101→front side (2) 1102→back side (1) 1103→back side (2) 1104→front side (3) 1105→front side (4) 1106→back side (3) 1107→back side (4) 1108. Further, the acquired images are transmitted in the correct page order of: front side (1) 1109→back side (1) 1110→front side (2) 1111→back side (2) 51112→front side (3) 51113→back side (3) 51114→front side (4) 51115→back side (4) 51116.

According to the above-described method, even if a transmission method such as the direct transmission where the images are transmitted while the document images are read is designated, the performance of the reading operation can be maintained by reading a plurality of documents in the "collective reading mode" and transmitting the acquired images.

As described above, according to the present embodiment, the use of the memory of the storage unit can be reduced when a plurality of documents are read in the "collective reading mode". Thus, embodiments of the present invention do not depend on whether the direct transmission is used as the image transmission method. For example, an embodiment of the present invention can be applied to a case where an image reading apparatus having only a small capacity storage unit for cost reasons reads images of the documents in the "collective reading mode" and transmits the images. Further, another embodiment of the present invention can be applied to a case where an image reading apparatus having a large capacity storage unit but retaining only a small free space reads images of the documents in the "collective reading mode" and transmits the images.

According to the above-described exemplary embodiment, the obtained image data is transmitted to an external apparatus. However, according to a fourth exemplary embodiment, the acquired image data is transmitted to (stored in) a SD card or a USB memory card. According to the present embodiment, although a SD card and a USB memory card are described as the examples of the external memory, other type of external memory can also be used.

As described above, the image reading apparatus according to the present embodiment includes, for example, the configurations below. To be more precise, the image reading apparatus according to the present embodiment includes a reading unit which can read images of conveyed documents in the order of the image of the first side of the first document, the first side of the second document, the second side of the first document, and the second side of the second document.

The image reading apparatus according to the present embodiment outputs the first side of the first document read by the reading unit and stores the image of the second side of the first document read by the reading unit in the storage unit. Further, the image reading apparatus according to the present embodiment includes an output unit which, after outputting the image of the first side of the second document read by the reading unit, outputs the image of the second side of the first document stored in the storage unit, and further outputs the image of the second side of the second document read by the reading unit.

The image reading apparatus according to the present embodiment can execute a first reading operation which is an operation for reading the image of the first side of the second document and the second side of the second document which are conveyed after reading the image of the first side of the first document and the second side of the first document which are conveyed. Further, the image reading apparatus according to the present embodiment can execute a second reading operation which is an operation for reading the image of the second side of the first document and the second side of the second document which are conveyed after reading the image of the first side of the first document and the first side of the second document which are conveyed.

Further, the image reading apparatus according to the present embodiment can designate either the first output method or the second output method as the output method of the images. The first output method is to output images after they are read from documents by a reading unit and stored in a storage unit. The second output method is to output images while they are read from documents by a reading unit and are being stored in a storage unit. Further, the image reading apparatus according to the present embodiment includes a control unit that causes the reading unit to perform the second reading operation when the second output method is designated by the designation unit.

Each process of the present invention is also realized by execution of software (program) acquired via a network or various storage media by a processing device (CPU, processor) of a personal computer (computer). The present invention is not limited to the above-described exemplary embodiments and various changes and modifications (including organic integration of the exemplary embodiments) can be applied so long as they fall within the scope of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-190879 filed Sep. 1, 2011, which is hereby incorporated by reference herein in its entirety.

What is claimed is:

1. An image reading apparatus comprising:
a reading unit configured to read an image of a first side of a first document and an image of a first side of a second document, and to read an image of a second side of the first document and an image of a second side of the second document after reading the image of the first side of the first document and the image of the first side of the second document, and
an output unit configured to output the image of the first side of the first document read by the reading unit without storing the image of the first side of the first document in a storage unit, to store the image of the first side of the second document read by the reading unit in the storage unit, to output the image of the second side of the first document read by the reading unit without storing the image of the second side of the first document in the storage unit after outputting the image of the first side of the first document, to output the image of the first side of the second document stored in the storage unit after outputting the image of the second side of the first document read by the reading unit, and to output the image of the second side of the second document read by the reading unit without storing the image of the second side of the second document in the storage unit after outputting the image of the first side of the second document.

2. The image reading apparatus according to claim 1, further comprising:
a setting unit configured to set whether one-sided reading or two-sided reading is to be executed,
wherein, if two-sided reading is set by the setting unit, the reading unit reads the image of the first side of the first document, reads the image of the first side of the second document after reading the image of the first side of the first document, reads the image of the second side of the first document after reading the image of the first side of the second document, and reads the image of the second side of the second document after reading the image of the second side of the first document.

3. The image reading apparatus according to claim 2, wherein if one-sided reading is set by the setting unit, the reading unit reads the image of the first side of the first document, and reads the image of the first side of the second document after reading the image of the first side of the first document.

4. The image reading apparatus according to claim 1, wherein the output unit is a transmission unit configured to transmit an image of a document to a memory the image reading apparatus or to transmit the image of the document to an external memory.

5. A control method of a reading apparatus, the method comprising:
reading an image of a first side of a first document and an image of a first side of a second document, and reading an image of a second side of the first document and an image of a second side of the second document after reading the image of the first side of the first document and the image of the first side of the second document; and
outputting the read image of the first side of the first document without storing the read image of the first side of the first document in a storage unit, storing the read image of the first side of the second document in the storage unit, outputting the read image of the second side of the first document without storing the read image of the second side of the first document in the storage unit after outputting the read image of the first side of the first document, outputting the read image of the first side of the second document which has been stored in the storage unit after outputting the read image of the second side of the first document, and outputting the read image of the second side of the second document without storing the read image of the second side of the second document in the storage unit after outputting the read image of the first side of the second document.

6. A non-transitory computer-readable storage medium storing a program causing a computer to execute the control method according to claim 5.

7. An image reading apparatus comprising:
a reading unit configured (1) to generate first image data by reading an image of a first side of a first document, (2) to generate second image data by reading, after reading the image of the first side of the first document, an image of a first side of a second document, (3) to generate third image data by reading, after reading the image of the first side of the second document, an image of a second side of the first document, and (4) to generate forth image data by reading, after reading the image of the second side of the first document, an image of a second side of the second document; and
a control unit configured (A) to output the first image data generated by the reading unit to a destination without storing the first image data in a storage unit, (B) to store the second image data generated by the reading unit in the storage unit, (C) to output, after outputting the first image data, the third image data generated by the reading unit to the destination without storing the third image data in the storage unit, (D) to output, after outputting the third image data, the second image data stored in the storage unit to the destination, and to output, after outputting the second image data, the forth image data generated by the reading unit to the destination without storing the fourth image data in the storage unit.

* * * * *